(12) United States Patent
Cruanes et al.

(10) Patent No.: US 8,145,642 B2
(45) Date of Patent: Mar. 27, 2012

(54) METHOD AND APPARATUS TO SUPPORT BITMAP FILTERING IN A PARALLEL SYSTEM

(75) Inventors: Thierry Cruanes, Foster City, CA (US);
Benoit Dageville, Foster City, CA (US);
William H. Waddington, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2033 days.

(21) Appl. No.: 11/001,363

(22) Filed: Nov. 30, 2004

(65) Prior Publication Data

US 2006/0117036 A1 Jun. 1, 2006

(51) Int. Cl.
*G06F 17/30* (2006.01)
(52) U.S. Cl. ........................................ 707/745
(58) Field of Classification Search .................. 707/745
See application file for complete search history.

(56) References Cited

U.S. PATENT DOCUMENTS

| | | | | |
|---|---|---|---|---|
| 5,848,408 A | * | 12/1998 | Jakobsson et al. | 707/3 |
| 5,987,453 A | * | 11/1999 | Krishna et al. | 707/4 |
| 6,618,729 B1 | * | 9/2003 | Bhashyam et al. | 707/101 |
| 6,665,684 B2 | * | 12/2003 | Zait et al. | 707/102 |
| 6,957,210 B1 | * | 10/2005 | Ramesh | 707/2 |
| 6,957,222 B1 | * | 10/2005 | Ramesh | 707/101 |
| 7,092,954 B1 | * | 8/2006 | Ramesh | 707/100 |
| 7,231,387 B2 | * | 6/2007 | Sauermann et al. | 707/745 |

OTHER PUBLICATIONS

Graefe et al. "Hash joins and hash teams in Microsoft SQL server". 1998. Proceedings of the 24th VLDB Conference New York, USA. pp. 87-90. Retrieved Feb. 13, 2007 from <http://www.sigmod.org/vldb/conf/1998/p086.pdf>.*
Dharmapurikar, Sarang, et al., "Deep Packet Inspection using Parallel Bloom Filters," retrieved from the internet at <http://www.arl.wustl.edu/~sarang/27_dharmapurikar_s_updated.pdf, retrieved on Oct. 28, 2005, pp. 1-8.

* cited by examiner

*Primary Examiner* — Mark A Radtke
(74) *Attorney, Agent, or Firm* — Hickman Palermo Troung & Becker LLP

(57) ABSTRACT

Techniques are described for combining pieces of information from two sources. The techniques may be used to improve the performance, for example, of hash join operations that are parallelized using slaves distributed across multiple nodes. According to one technique, bitmap filtering operations are performed by the probe-phase producer slaves, rather than the probe-phase consumer slaves. To avoid having to merge separately built bitmap filter chunks, the left-hand rows may be sent to every probe-phase consumer slave. Alternatively, the merge operation may be avoided by distributing the rows of one source based on how the other source has been statically partitioned.

38 Claims, 5 Drawing Sheets

METHOD AND APPARATUS TO SUPPORT BITMAP FILTERING IN A PARALLEL SYSTEM

FIELD OF THE INVENTION

The present invention relates to managing data and, more specifically, to performing parallelized operations that combine information from two sources.

BACKGROUND

It is often desirable to combine digital information from two sources based on some relationship between the information from the two sources. Because such operations are common, it is critical that they be performed in an efficient manner.

For the purpose of explanation, examples of the techniques described herein shall be given in the context of database systems. However, the techniques are not limited to such a context, and may be applied in any context in which digital information from one source is being combined with digital information from another source.

In the context of a database system, a join operation is an example of an operation that combines digital information from one source with digital information from another source. In a typical join operation, rows from one table are joined with rows from another table based on a join key.

For example, assume that a database has an "emp" table with information about employees, and a "dept" table with information about departments. Each row in the emp table corresponds to a particular employee, and has a deptID column that stores the unique identifier of the department in which the employee works. On the other hand, each row in the dept table corresponds to a particular department, and includes a column that stores the deptID of the department represented by the row. A typical join operation may involve combining each row in the emp table with the row in the dept table that has a matching deptID value. In this example, deptID is what is referred to as the "join key" of the join operation.

Hash Joins

One way to increase the performance of a join operation is to (1) generate a hash table based on the join key values in one source, and (2) use the hash table to determine the correlation between rows in the first source and rows in the second source. A join operation that is performed using a hash table is referred to as a "hash join". During the first phase of a hash join (referred to as the "build phase"), the hash table is created by performing the following for each row from one of the row sources involved in the join operation (referred to as the "left-hand" row source): (1) read the row, (2) apply a hash function to the join key value in the row to produce a hash value, (3) use the hash value as an index to identify a particular bucket in a hash table, and (4) store, in the bucket, an entry for the row. The hash table entry for a row typically includes the unique identifier of the row, and the join key value for the row. Because the join-key-value-to-hash-key-value relationship is many-to-one, several rows may hash to the same hash table bucket.

Once all of the rows of the left-hand row source have been processed, the hash table is complete a second phase (referred to as the "probe phase") may begin. During the probe phase, the hash table is used to perform the join by performing the following for each row from the other row source involved in the join operation (referred to as the "right-hand" row source): (1) read the row, (2) apply the hash function to the join key value in the row to produce a hash value, (3) use the hash value as an index into the hash table to identify a particular bucket in the hash table, (4) inspect the entries in the bucket (if any) to identify entries for any left-hand rows that have the same join key value as the row, and (5) combine the row with each left-hand row that has the same join key value.

Unfortunately, the hash table may become so large that some or all of it has to be swapped out of volatile memory and stored on disk. When this occurs, performance of the probe phase operations is reduced, due to the fact that at least some of the probes into the hash table will require disk access. Such disk access is particularly wasteful when a probe is performed merely to find out that a bucket is empty.

Bitmap Filters

A technique has been developed for avoiding the need to access the hash table (which may require disk access) merely to determine that the hash bucket that corresponds to a particular row is empty. The technique involves generating a bitmap filter that indicates whether buckets in the hash table have any entries. Specifically, each bit in the bitmap filter corresponds to a bucket in the hash table. Initially, each bit in the bitmap filter is set to a value that indicates that the corresponding bucket is empty. When an entry is placed into a bucket of the hash table during the build phase of a hash join, the bit that corresponds to the bucket is set to a value that indicates that the bucket is not empty. Consequently, at the end of the build phase of the hash join, the bit for each bucket indicates whether the corresponding bucket contains any entries.

A bitmap filter is typically small enough that it can remain entirely in volatile memory during the probe phase of the hash join. During the probe phase of the hash join, the bitmap filter is inspected prior to accessing the hash table. If the bitmap filter indicates that the bucket to which a right-hand row hashes is empty, then the hash table need not be accessed to know that the right-hand row does not join with any left-hand row. Because the hash table is not accessed under these conditions, some disk accesses are avoided.

Parallel Hash Joins

Referring to FIG. 1, when a hash join is performed in parallel, the scan of the left-hand row source is performed by a set of slave processes (the "build-phase producer slaves"). The build-phase producer slaves distribute the left-hand rows that they read to another set of slaves (the "build-phase consumer slaves") based on some join-key-to-consumer-slave mapping. In the illustrated embodiment, the hash join is being performed by slaves on two nodes: node 1 and node 2. Each of the two nodes has two build-phase producer slaves and two build-phase consumer slaves. To better illustrate the communication between slave groups, the build-phase producer slaves are shown separate from the build-phase consumer slaves, even though they may reside on the same nodes as some of the build-phase consumer slaves.

The join-key-to-consumer-slave mapping used to distribute left-hand rows to the build-phase consumer slaves may be based on a distribution hash function applied to the join key, or based on ranges associated with the join key. For example, assume that the dept table is the left-hand row source of an equi-join operation with the emp table. Under these circumstances, each build-phase consumer slave may be assigned a particular range of dept-id values. The build-phase producer slaves would scan respective portions of the dept table, and distribute each dept table row to the build-phase consumer slave that is associated with the range into which the dept-id value of the row falls.

During the build phase, segments of the bitmap filter are separately constructed by the build-phase consumer slaves. As each build-phase consumer slave processes a left-hand row, the build-phase consumer slave updates a private bitmap filter chunk to indicate that the bucket to which the left-hand row hashes is not empty. Thus, at completion of the build phase of a parallel join operation, each build-phase consumer slave has a private bitmap filter chunk that indicates the hash buckets that contain entries for the left-hand rows that were received by that particular build-phase consumer slave.

During probe phase of the parallel join operation, the join-phase consumer slaves can be reused as probe-phase consumer slaves (as illustrated in FIG. 1). The probe-phase consumer slaves receive right-hand rows from probe-phase producer slaves, and perform the following for each right-hand row they receive: (1) generate a hash value based on the join key in the right-hand row, (2) inspect their private bitmap filter chunk to determine whether the hash bucket for that join key is empty, (3a) if the hash bucket for the join key is empty, then the right-hand row can be discarded since it does not join with any left-hand row, and (3b) if the hash bucket for the join key is not empty, then use the hash table to determine which left-hand rows join with the right-hand row (if any), and join the appropriate rows.

The use of the bitmap filter avoids the need to access the hash table (and potentially access the disk) in the case where the hash bucket to which a right-hand row hashes is empty. However, the probe-phase consumer slaves must receive the right-hand rows before the probe-phase consumer slaves can determine whether the right-hand rows can be discarded. If the probe-phase producer slave that produces a particular right-hand row is on a different node than the probe-phase consumer slave to which the row must be sent, then the right-hand row must be communicated between nodes prior to determining whether the right-hand row can be discarded.

For example, as illustrated in FIG. 1, each of nodes 1 and 2 has two probe-side producer slaves. Similarly, each of nodes 1 and 2 has two probe-side consumer slaves. Under these circumstances, inter-node traffic is generated whenever a probe-side producer slave on node 1 sends a right-hand row to a probe-side consumer slave on node 2, and whenever a probe-side producer slave on node 2 sends a right-hand row to a probe-side consumer slave on node 1.

Because inter-node traffic is relatively expensive, it is unfortunate that some right-hand rows are sent between nodes merely to later determine that the right-hand rows can be discarded. Thus, it is desirable to provide techniques for more efficiently performing join operations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Equi-Joins Using Producer-Side Bitmap Filters

As mentioned above, it is wasteful to send a right-hand row from one node executing a probe-phase producer slave to another node executing a probe-phase consumer slave merely to have the row discarded because the bitmap filter indicates that the corresponding hash bucket is empty. Such waste is avoided, according to one embodiment of the invention, by (1) sending the bitmap filter to the nodes that are executing the probe-phase producer slaves, and (2) having the probe-phase producer slaves use the bitmap filter to filter the right-hand rows prior to sending the right-hand rows to the probe-phase consumer slaves.

Figure 1:
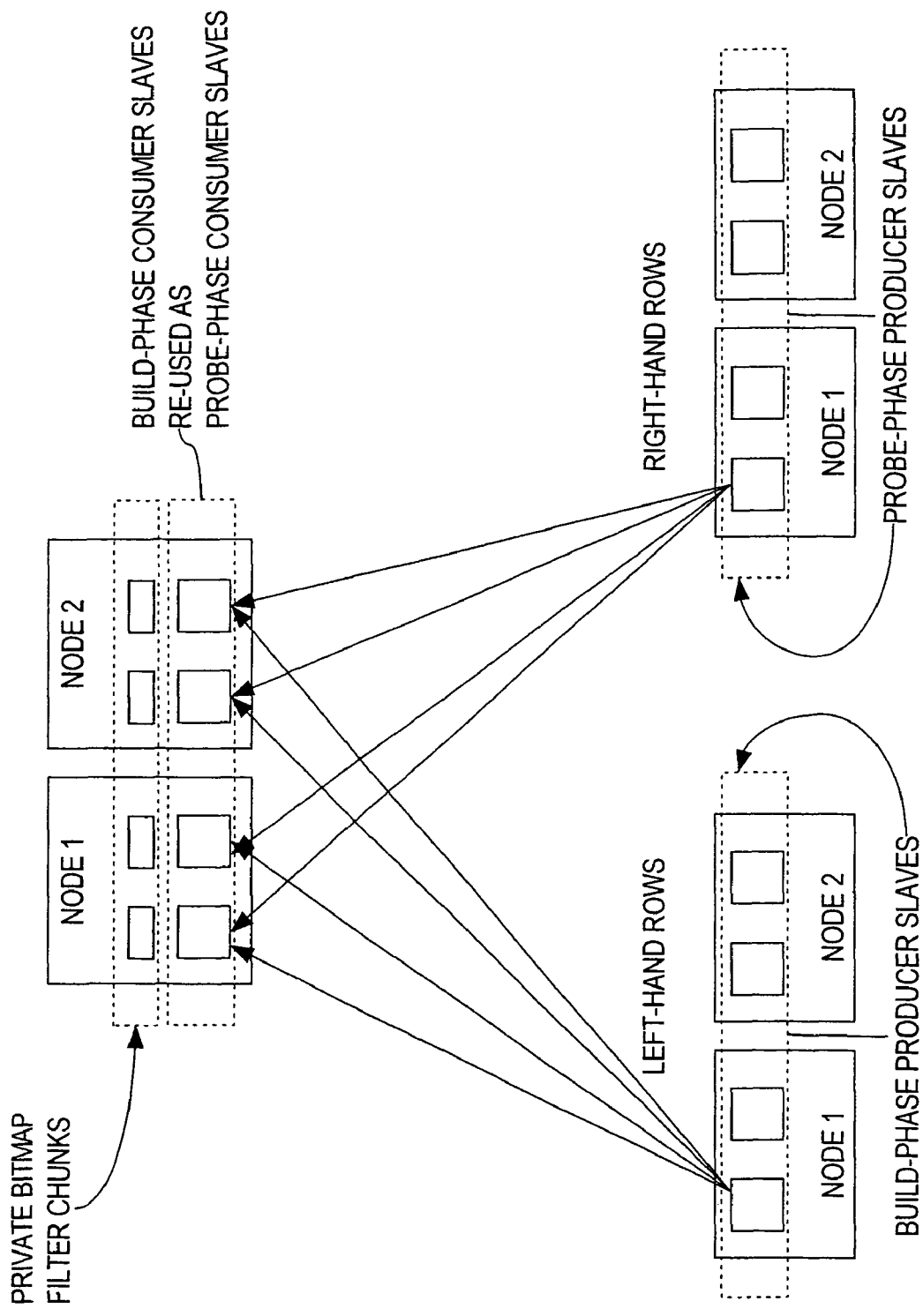
FIG. 1 is a block diagram illustrating the use of private bitmap filter chunks to perform bitmap filtering in a parallelized hash join operation.
Figure 2:
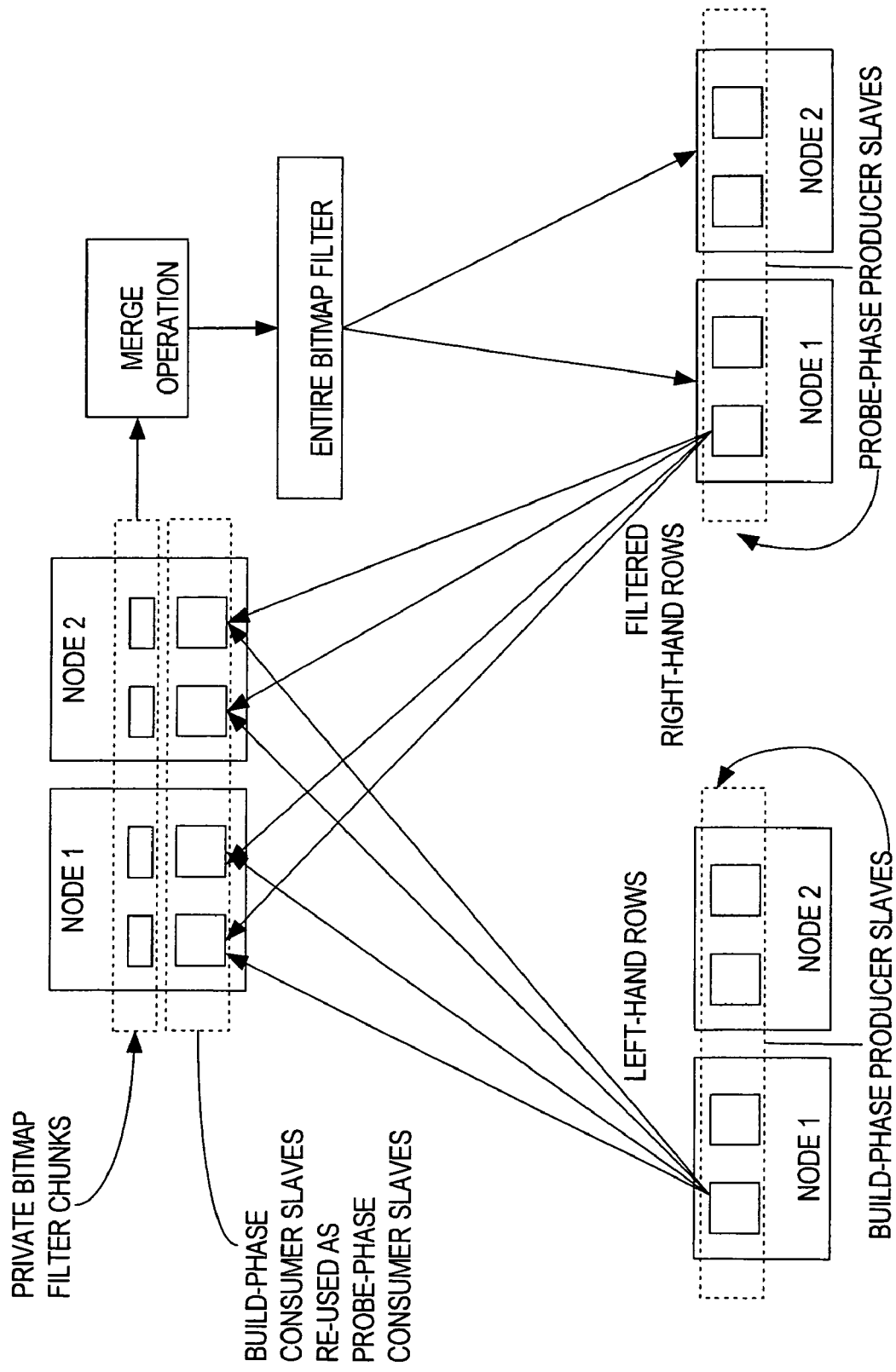
FIG. 2 is a block diagram illustrating a system in which bitmap filtering is performed by probe-phase producer slaves, according to an embodiment of the invention.

Each probe-phase producer slave must have the entire bitmap filter, because the rows produced by probe-phase producer slaves are not limited to any particular set of join key values. Therefore, as illustrated in FIG. 2, the compete bitmap filter is sent to each node that includes a probe-phase producer slave. Once received, the bitmap filter may be stored in the shared memory of each such node, and shared by all probe-phase producer slaves on the node.

Upon obtaining a right-hand row, a probe-phase producer slave inspects the locally-stored bitmap filter to determine whether the right-hand row hashes to an empty hash bucket. If the right-hand row hashes to an empty hash bucket, then the right-hand row is discarded without ever being sent to any probe-phase consumer slave. On the other hand, if the right-hand row hashes to a non-empty hash bucket, then the right-hand row is sent to the appropriate probe-phase consumer slave.

Because the rows that are received by the probe-phase consumer slaves have already been filtered based on the bitmap filter, the probe-phase consumer slaves need not perform such filtering again. Instead, the probe-phase consumer slaves may immediately access the hash table to determine whether the right-hand row actually joins with any left-hand rows. If the right-hand row joins with one or more left-hand rows, then the probe-phase consumer slave performs the join to produce joined rows.

Bitmap Filter Merging

Referring again to FIG. 2, to pre-filter the right-hand rows, the probe-phase consumer slaves require the entire bitmap filter because there is no constraint on the join key values of the right-hand rows they produce. Thus, prior to the probe phase, a merge operation must be performed to construct a bitmap filter based on the private bitmap filter chunks that were built by the various build-phase consumer slaves.

During the merge operation, each build-phase consumer slave may broadcast its private bitmap filter chunk to all other build-phase consumer slaves. Each build-phase consumer slave may then produce the full bitmap filter by performing a logical OR operation between its private bitmap filter chunk and the bitmap filter chunks of all other build-phase consumer slaves. The bitmap filters thus created may then be transmitted from the build-phase consumer slaves to the nodes containing the probe-phase producer slaves. In the case where the build-phase consumer slaves reside on the same nodes as the probe-phase producer slaves, the inter-note transmission of the entire bitmap filter is not required.

Because the bitmap filter chunks are ultimately going to be merged into a complete bitmap filter prior to use, the bitmap filter chunks must collectively reflect all of the left-hand rows. However, it is not necessary for each of the bitmap filter chunks to correspond to a unique range of join key values. Therefore, the bitmap filter chunks may be built by either the build-phase consumer slaves or the build-phase producer slaves. The set of build-phase slaves that is assigned the task of building the bitmap filter chunks may vary from implementation to implementation. For the purpose of explanation, embodiments shall be described hereafter in which the bitmap filter chunks are constructed by the build-phase consumer slaves.

Unfortunately, there is one private bitmap filter chunk per build-phase consumer slave, so the number of bitmap filter chunks involved in a merge operation increases in proportion to the number of build-phase consumer slaves (regardless of how many nodes they are spread among). When the build-phase consumer slaves are spread across several nodes, having each build-phase consumer slave broadcast its private bitmap filter chunk to all other build-phase consumer slaves can generate a significant amount of inter-node traffic. For example, in the embodiment illustrated in FIG. 2, the build-phase consumer slaves on node 1 would have to send their private bitmap filter chunks to the build-phase consumer slaves on node 2. Similarly, the build-phase consumer slaves on node 2 would have to send their private bitmap filter chunks to the build-phase consumer slaves on node 1.

Shared Memory Bitmap Filter Chunks

As mentioned above, build-phase consumer slaves typically generate private bitmap filter chunks that, for consumer-side filtering, must ultimately be merged to create the entire bitmap filter. With one private bitmap filter chunk per build-phase consumer slave, the bitmap filter chunk merger operation may be more computationally expensive than desirable. According to one embodiment, the number of bitmap filter chunks generated during the build-phase is reduced from one-per-slave to one-per-node that is executing a filter-building slave.

Specifically, a single node may include more than one build-phase consumer slave. Therefore, according to one embodiment, at least within those nodes that have more than one build-phase consumer slave, a single bitmap filter chunk is constructed in shared memory. Such bitmap filter chunks are referred to herein as "shared bitmap filter chunks". An embodiment that uses shared bitmap filter chunks is illustrated in FIG. 3.

Figure 3:
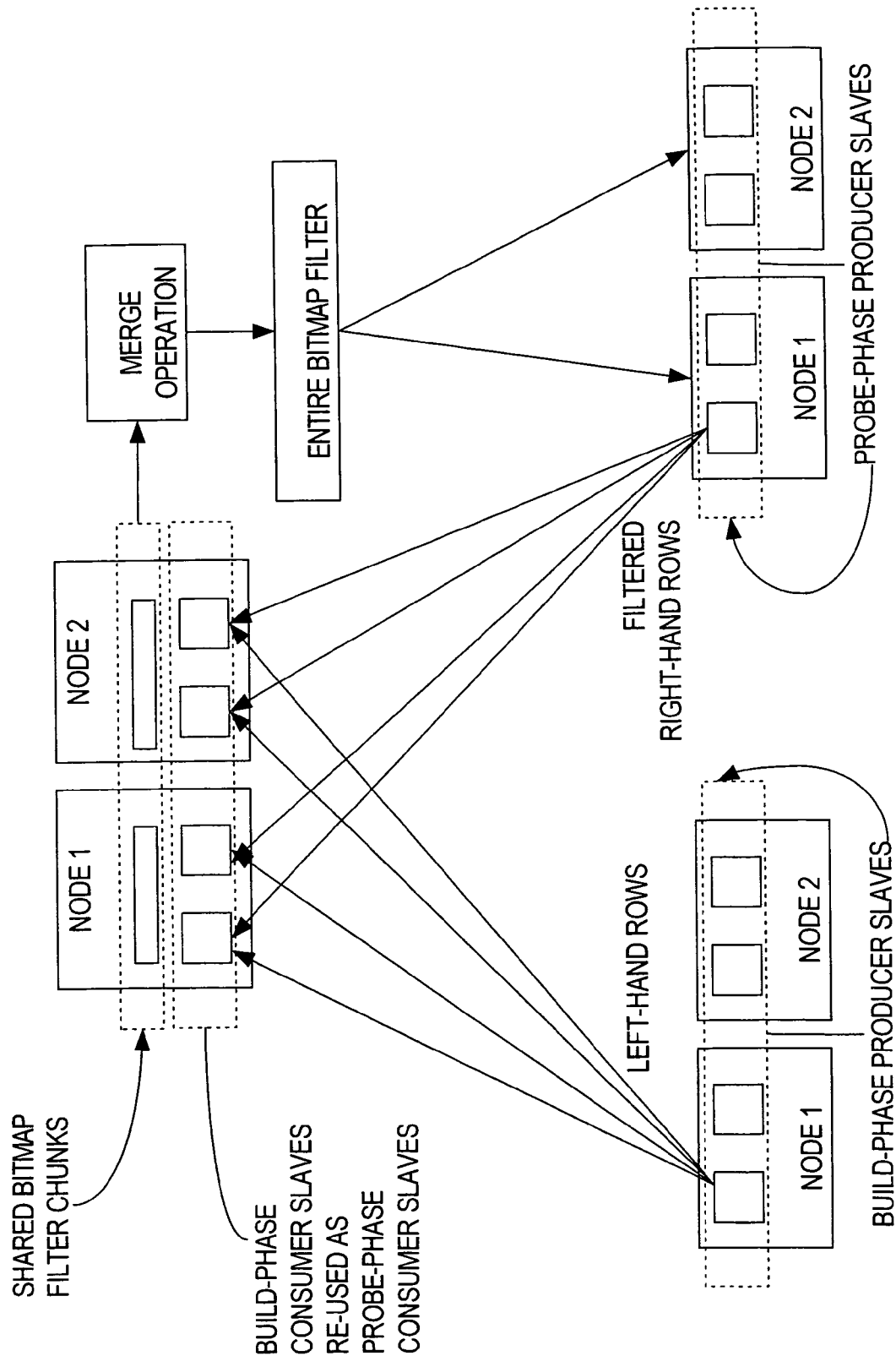
FIG. 3 is a block diagram illustrating the use of shared bitmap filter chunks for bitmap filtering, according to an embodiment of the invention.

Referring to FIG. 3, all build-phase consumer slaves that have access to the same volatile memory update the shared bitmap filter chunk in the shared memory. Thus, after the build phase of the hash join operation, each node that includes any build-phase consumer slave will have a shared bitmap filter chunk that reflects all of the rows processed by the build-phase consumer slaves on that particular node. Consequently, there will be as many shared bitmap filter chunks as there are nodes that have build-phase consumer slaves. This number may be significantly less than the number of private bitmap filter chunks that would have been generated by the same set of build-phase consumer slaves.

When multiple nodes have build-phase consumer slaves, the shared bitmap filter chunk in each node has to be merged with the shared bitmap filter chunk of each other node to produce the complete bitmap filter. According to one embodiment, the efficiency of the bitmap filter chunk merge operation is improved by assigning each slave within a node a separate portion of the shared bitmap filter chunk for the purpose of performing the merge operation. In parallel, each build-phase consumer slave on each node sends its assigned portion of the shared bitmap filter chunk to each other node that includes a build-phase consumer slave. At the receiving end, the build-phase consumer slaves execute in parallel to merge incoming bitmap filter chunks into the local shared bitmap filter chunk.

According to an alternative embodiment, the amount of inter-node communications performed during the merge operation is reduced by selecting a single node to receive all of the shared bitmap filter chunks. All build-phase consumer slaves that do not reside on the selected node send their assigned portion of their shared bitmap filter chunk to the selected node. The various portions of shared bitmap filter chunks may be merged at the selected node to construct the bitmap filter. The bitmap filter may then be disseminated from that node to all other nodes that have slaves that require access to the bitmap filter. According to one embodiment, the node that has the largest number of build-phase consumer slaves is selected as the node on which to construct the bitmap filter.

While parallelizing the transmission of bitmap filter chunks improves the bitmap filter chunk merger operations, there are some situations in which the use of bitmap filters is still not efficient. Therefore, according to one embodiment, certain filter testing steps are performed prior to building and/or using a bitmap filter.

Filter Testing

Producer-side bitmap filtering, as described above, avoids unnecessary transmission of right-hand rows that hash to an empty bucket. However, this benefit has a cost. Specifically, the cost of the bitmap filter chunk merge operation may exceed the benefit of producer-side bitmap filtering if relatively few right-hand rows will be filtered by the bitmap filter. Therefore, according to one embodiment, various tests are performed to determine whether the benefits derived by using the producer-side bitmap filter will exceed the costs of merging the bitmap filter chunks and transmitting the full bitmap filter. If the benefits derived by producer-side bitmap filtering will not exceed the associated costs, then consumer-side bitmap filtering may be used without merging the bitmap filter chunks.

For example, if, during a hash join operation, a small percentage of the hash buckets of the hash table are empty, then use of a producer-side bitmap filter will probably not result in the filtering of many right-hand rows. According to one embodiment, a "sparseness" test is performed to determine whether use of a producer-side bitmap filter will be worthwhile in a given hash join operation. Specifically, if after the build phase it appears that the bitmap filter will not be sparse enough, then the producer-side bitmap filter is not used during the probe phase. The sparseness test may be performed based on the state of the bitmap filter chunks prior to constructing the full bitmap filter.

The sparseness test may also be conducted based on the selectivity of the hash join relation. If the hash join relation filters relatively few rows, then the bitmap filtering may be performed on the consumer-side based on private bitmap filter chunks (requiring no merge operation), or not performed at all.

Even though a bitmap filter may be sufficiently sparse, the join key values of the right-hand rows may be such that few right-hand rows are actually discarded based on the bitmap filter. Thus, instead of or in addition to the sparseness test, a sampling test may be performed. According to one embodiment, the sampling test is performed prior to constructing the bitmap filter. For example, the sampling test may be performed by (1) reading right-hand row samples, and (2) using the hash table to see what percentage of right-hand row samples actually combine with left-hand rows. If the percentage of right-hand row samples that combine with left-hand rows is high, then the bitmap filter is not likely to filter many right-hand rows. Therefore, the hash join operation is performed without using a producer-side bitmap filter.

Using Left-Hand Broadcasting to Avoid Bitmap Filter Chunk Merger

According to one embodiment, a bitmap filter can be constructed without merging bitmap filter chunks by (1) broadcasting every left-hand row to every build-phase consumer slave, and (2) causing each of the build-phase consumer slaves to build the entire bitmap filter based on the left-hand rows they receive. The bitmap filters thus constructed can then used by the probe-phase producer slaves.

Various techniques may be used to cause every build-phase consumer slave to process every left-hand row. For example, the build-phase producer slaves may be designed to broadcast every left-hand row they produce to every build-phase consumer slave. Since each build-phase consumer slave phase receives all left-hand rows, the bitmap filter chunk built by each build-phase consumer slave will be the entire bitmap filter. This technique allows the construction of the bitmap filter without any need to merge bitmap filter chunks. The performance benefit of avoiding the merge operation may exceed to cost of sending all left-hand rows to all build-phase consumer slaves in situations, for example, where the left-hand source has relatively few rows.

In an alternative embodiment, the build-phase producer slaves may distribute the left-hand rows to ensure that every node that is executing a build-phase consumer slave receives every left-hand row. Under these circumstances, every left-hand row would be processed by one of the build-phase consuming slaves on a given node, but not necessarily by all of the build-phase consuming slaves on the node. Each of the build-phase consuming slaves may be designed to update a shared bitmap filter chunk to reflect the rows that it receives. Consequently, at the end of the build phase, every node containing any build-phase consumer slave will have the entire bitmap filter without the need to perform any merger operations.

Instead of broadcasting every left-hand node to every build-phase consumer, the left-hand rows may be distributed to build-phase consumers as normal, except that one node is sent every left-hand row. The node that receives all of the left-hand rows can build the complete bitmap filter. After the complete bitmap filter has been constructed in this fashion, it may be communicated to all nodes that will execute probe-phase producer slaves, to allow the probe-phase producer slaves to perform producer-side bitmap filtering.

Combining Probe-Phase Operations

In the embodiments described above, during the probe-phase, probe-phase producer slaves obtain the right hand rows, perform producer-side bitmap filtering, and redistribute the right-hand rows to a separate set of probe-side consumer slaves based and a join-key-to-consumer slave mapping. The probe-side consumer slaves then perform the join operations between the right-hand rows and the left-hand rows.

According to an alternative embodiment, the slaves that were used to build the bitmap filters during the build-phase are re-used during the probe-phase to perform both the producer-side bitmap filtering and the hash join operation. Specifically, if every left-hand row was sent to every build-side consumer slave, then every build-side consumer slave has access to (1) the entire bitmap filter and (2) all left-hand rows. When re-used as probe-phase producer slaves, the build-side consumer slaves can perform the bitmap filtering for any right-hand row because they have access to the entire bitmap filter. Further, each of the build-side producer slaves can perform any required joins because they each have access to all of the left-hand rows.

Thus, during the probe-phase, each build-side consumer slave is re-used as a probe-side producer slave that repeatedly (1) obtains a right-hand row, and (2) uses the bitmap filter to determine whether the right-hand row maps to an empty hash bucket. If the right-hand row does not map to an empty hash bucket, then the probe-side producer slave (3) uses the hash table to determine whether the right-hand row joins with any left-hand row, and (4) combines the right-hand row with any of the left-hand rows that have the same join key value.

This approach avoids (1) the need to merge bitmap filter chunks, (2) the need to send the bitmap filter from build-phase consumer slaves to separate probe-phase producer slaves, and (3) the need to send right-hand rows from probe-phase producer slaves to separate probe-phase consumer slaves based on a join-key-to-consumer slave mapping. The efficiency gained by avoiding these tasks may outweigh the cost of sending every left-hand row to every build-phase consumer slave process.

Avoiding Both Left-Hand Broadcasts and Bitmap Filter Chunk Merger

According to one embodiment, (1) the need to merge bitmap filter chunks, (2) the need to send the bitmap filter from build-phase consumer slaves to separate probe-phase producer slaves, and (3) the need to send right-hand rows from probe-phase producer slaves to separate probe-phase consumer slaves based on a join-key-to-consumer slave mapping, may all be avoided without having to broadcast all left-hand rows to all build-phase consumer slaves, under certain conditions.

For example, assume that both the right-hand row source and the left-hand row source are partitioned based on the join key. Under these conditions, each partition may be assigned to a particular node that will be involved in the parallel join operation. During performance of the parallel join operation, the slaves on a given node are only responsible for performing their operations on the rows of the partitions assigned to the node.

Various techniques may be used to perform parallel operations on partitioned objects. For example, techniques for performing intra-partition parallelization are described in U.S. patent application Ser. No. 09/851,065, entitled "Enabling Intra-Partition Parallelism for Partition-Based Operations", the contents of which are incorporated herein by reference.

Figure 4:
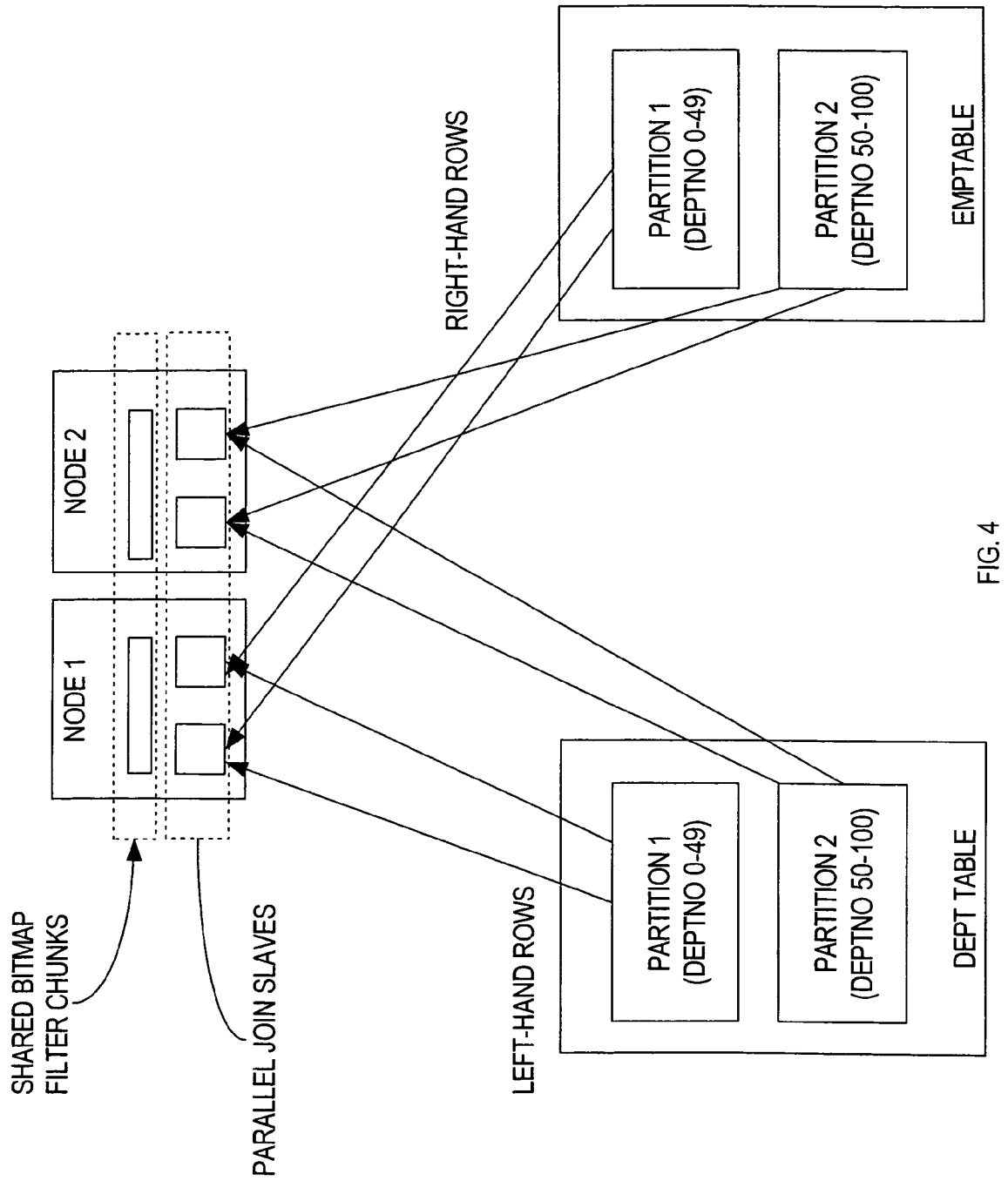
FIG. 4 is a block diagram illustrating the distribution of rows based on static partitions, according to an embodiment of the invention.

FIG. 4 is a block diagram that illustrates a scenario in which the dept table (the left-hand row source) is statically partitioned into two partitions, corresponding to join key values 0-49 and 50-100. Similarly, the emp table (the right-hand row source) is statically partitioned into two partitions, corresponding to join key values 0-49 and 50-100. The partitions associated with the join key values 0-49 have been assigned to node 1. The partitions associated with the join key values 50-100 have been assigned to node 2.

During the build phase, slaves on node 1 scan rows from partition 1 of the dept table, and build a shared bitmap filter chunk within node 1. At the end of the build phase, the shared bitmap filter chunk within node 1 will indicate which hash buckets have left-hand rows associated with the join key values 0-49. While slaves on node 1 are scanning partition 1 of the dept table, slaves on node 2 scan rows from partition 2 of the dept table, and build a shared bitmap filter chunk within node 2. At the end of the build phase, the shared bitmap filter chunk within node 2 will indicate which hash buckets have left-hand rows associated with the join key values 50-100.

During the probe phase, slaves on node 1 scan rows from partition 1 of the emp table, and use the shared bitmap filter chunk within node 1 to perform bitmap filtering. The information in the bitmap filter chunk within node 1 is sufficient to perform bitmap filtering on rows from partition 1 of the emp table because the rows in partition 1 of the emp table can only possibly join with rows in partition 1 of the dept table. While slaves on node 1 are scanning partition 1 of the emp table, slaves on node 2 scan rows from partition 2 of the emp table, and use the shared bitmap filter chunk within node 2 to perform bitmap filtering. The information in the bitmap filter chunk within node 2 is sufficient to perform bitmap filtering on rows from partition 2 of the emp table because the rows in partition 2 of the emp table can only possibly join with rows in partition 2 of the dept table.

Thus, at the end of the build phase, the bitmap filter chunk in each node already has the information necessary to perform bitmap filtering for the right-hand rows that will be encountered by that node during the probe phase. Consequently, the bitmap filter chunks of the various nodes do not have to be merged. In addition, left-hand rows do not have to be sent to all nodes, because the node that scans a particular left-hand row is guaranteed to be the only node that can possibly encounter right-hand rows with which the left-hand row can combine.

Bitmap Filtering with One Partitioned Source

In the example illustrated in FIG. 4, both the left-hand row source and the right-hand row source are statically partitioned based on join key values. However, similar results may be achieved when only one of the row sources is statically partitioned. When only one of the row sources involved in the hash join operation is statically partitioned, the other row source may be dynamically partitioned in a manner that corresponds to the static partitioning.

For example, assume that the emp table is statically partitioned as illustrated, but the dept table is not partitioned. Under these circumstances, the build-phase producer slaves redistribute the dept table rows to build-phase consumer slaves using redistribution criteria that corresponds to the partitioning criteria used to partition the emp table. For example, the build phase consumer slaves redistribute all of the dept rows associated with join key values 0-49 to build-phase consumer slaves on node 1. Similarly, the build phase consumer slaves redistribute all of the dept rows associated with join key values 50-100 to build-phase consumer slaves on node 2. As the build-phase consumer slaves receive dept table rows, they update a shared bitmap filter chunk as described above. At the end of the build phase, node 1 will have a shared bitmap filter chunk that reflects all of the dept table rows associated with join key values 0-49, and node 2 will have a shared bitmap filter chunk that reflects all of the dept table rows associated with join key values 50-100. Thus, during the probe-phase, slaves on node 1 can perform bitmap filtering on rows from partition 1 of the emp table based exclusively on the shared bitmap filter chunk within node 1. Similarly, slaves on node 2 can perform bitmap filtering on rows from partition 2 of the emp table based exclusively on the shared bitmap filter chunk within node 2.

Hardware Overview

Figure 5:
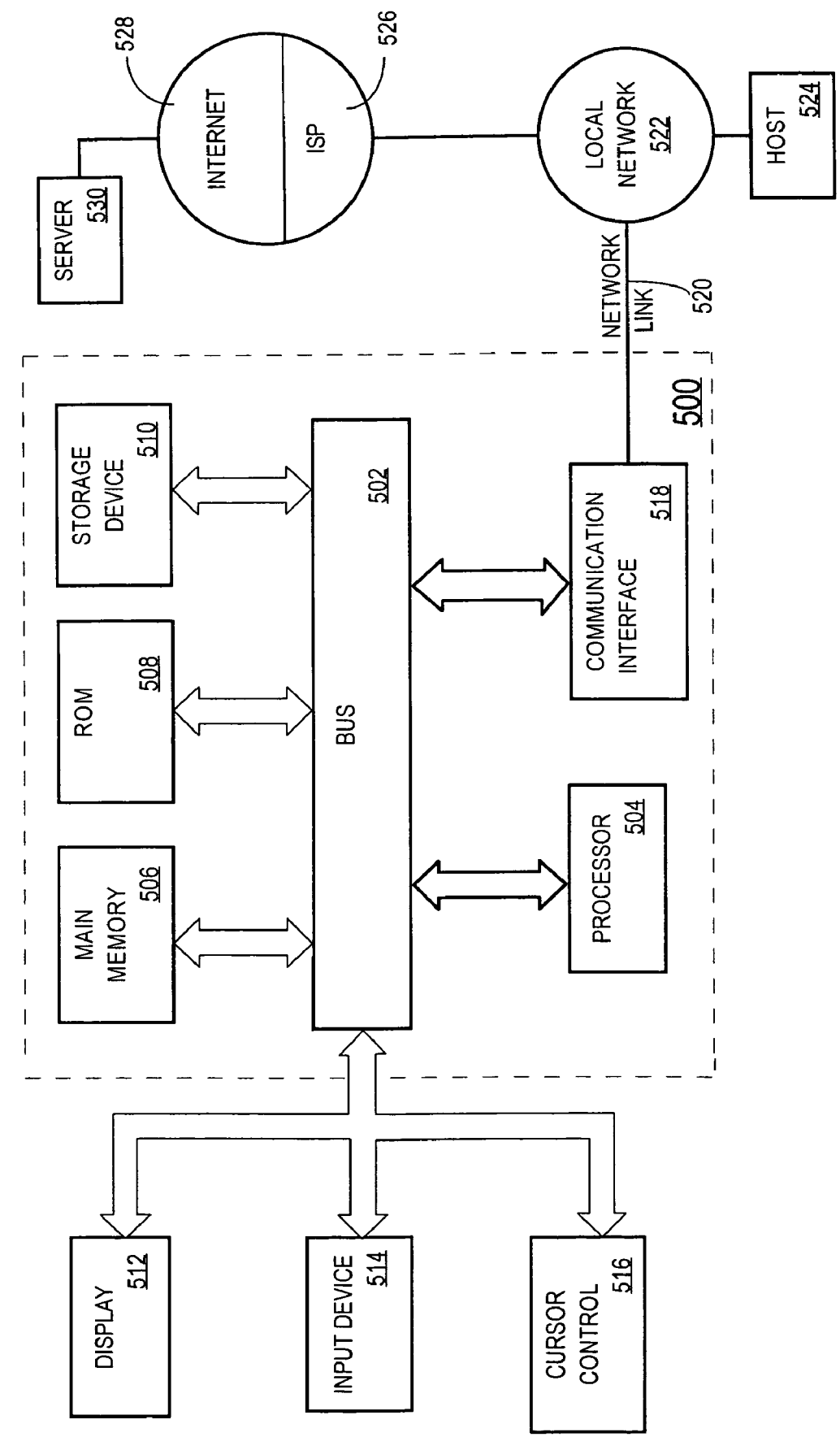
FIG. 5 is a block diagram of a computer system upon which the techniques described herein may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of combining information from a first source with information from a second source, wherein each piece of information from the first source is associated with a join key value, and each piece of information from the second source is associated with a join key value, the method comprising:

hashing the pieces of information from the first source to hash buckets of a hash table by applying a hash function to join key values associated with the pieces of information from the first source;

building a plurality of bitmap filter chunks that indicate the hash buckets to which the pieces of information from the first source are hashed;

wherein the plurality of bitmap filter chunks are spread among a plurality of nodes;

merging the plurality of bitmap filter chunks to create a bitmap filter;

causing each of a plurality of probe-phase producer slaves to repeatedly perform the steps of obtaining a piece of information from the second source;

determining the hash bucket to which the piece of information from the second source hashes by applying the hash function to the join key value associated with the piece of information from the second source;

inspecting the bitmap filter to determine whether the piece of information from the second source hashes to a hash bucket to which a piece of information from the first source was hashed; and sending the piece of information from the second source to a probe-phase consumer slave, of a plurality of probe-phase consumer slaves, only if the second source hashes to a hash bucket to which at least one piece of information from the first source was hashed;

wherein the plurality of probe-phase consumer slaves generate combined information by combining, based on join key values, (a) the pieces of information from the first source that the plurality of probe-phase consumer slaves receive from the probe side producer slaves with
(b) the pieces of information of the second source;

wherein the combined information is stored in a non-transitory computer-readable storage medium;

wherein the method is performed by one or more computing devices.

2. The method of claim 1 wherein:
the step of building a plurality of bitmap filter chunks that indicate the hash buckets to which the pieces of information from the first source are hashed is performed by build-phase slaves spread across said plurality of nodes;
a plurality of the build-phase slaves reside on a particular node of the plurality of nodes; and
the step of building a plurality of bitmap filter chunks that indicate the hash buckets to which the pieces of information from the first source are hashed includes causing the plurality of the build-phase slaves to collectively build a single shared bitmap filter chunk in shared memory of the particular node.

3. The method of claim 2 wherein the build-phase slaves that build said plurality of bitmap filter chunks are build-phase producer slaves that obtain the pieces of information from the first source and distribute the pieces of information to build-phase consumer slaves.

4. The method of claim 2 wherein the build-phase slaves that build said plurality of bitmap filter chunks are build-phase consumer slaves that receive the pieces of information from the first source from build-phase producer slaves.

5. The method of claim 1 wherein:
the step of building a plurality of bitmap filter chunks that indicate the hash buckets to which the pieces of information from the first source are hashed is performed by build-phase slaves spread across said plurality of nodes;
a plurality of the build-phase slaves reside on a particular node of the plurality of nodes; and
the step of building a plurality of bitmap filter chunks that indicate the hash buckets to which the pieces of information from the first source are hashed includes causing each of the plurality of the build-phase slaves to build a private bitmap filter chunk.

6. The method of claim 1 wherein:
the pieces of information from the first source are rows of a left-hand row source involved in a parallelized join operation within a database server; and
the pieces of information from the second source are rows of a right-hand row source involved in said parallelized join operation.

7. The method of claim 2 wherein the step of merging includes:
assigning to each of the plurality of the build-phase slaves a separate portion of the single shared bitmap filter chunk; and
causing the plurality of build-phase slaves to communicate to at least one other node of the plurality of nodes, in parallel, their respective assigned portions of the single shared bitmap filter chunk.

8. A method of combining information from a first source with information from a second source, wherein each piece of information from the first source is associated with a join key value, and each piece of information from the second source is associated with a join key value, the method comprising:
during a build phase, performing the steps of
sending pieces of information from the first source to a plurality of nodes, wherein the plurality of nodes includes one or more nodes that receive every piece of information from the first source;
at each of the one or more nodes, performing the steps of
hashing the pieces of information from the first source to hash buckets of a hash table by applying a hash function to join key values associated with the pieces of information from the first source; and
building and storing in a non-transitory computer-readable storage medium a complete bitmap filter that indicates the hash buckets to which the pieces of information from the first source are hashed;
during a probe phase, using a complete bitmap filter that was built and stored during the build phase to perform parallelized bitmap filtering;
wherein the method is performed by one or more computing devices.

9. The method of claim 8 wherein, during the probe phase, the complete bitmap filter is used by a plurality of probe-phase slaves that perform both:
scanning of the right-side source; and
joining of the pieces from the first source with corresponding pieces from the second source.

10. The method of claim 8 wherein:
each node of the plurality of nodes receives every piece of information from the first source; and
the steps of hashing and building are performed at each of the plurality of nodes.

11. The method of claim 10 wherein the step of using the complete filter during the probe phase includes, at each of the plurality of nodes, causing one or more slave processes to repeatedly perform the steps of
obtaining a piece of information from the second source;
determining the hash bucket to which the piece of information from the second source hashes by applying the hash function to the join key value associated with the piece of information from the second source;
inspecting the bitmap filter that was built at the node to determine whether the piece of information from the second source hashes to a hash bucket to which a piece of information from the first source was hashed; and
filtering out the piece of information from the second source if the piece of information from the second source does not hash to a hash bucket to which at least one piece of information from the first source was hashed.

12. The method of claim 11 wherein:
the step of filtering out is performed by each of a plurality of probe-phase producer slaves; and
each probe-phase producer slave sends pieces of information from the second source that were not filtered out to one of a plurality of probe-phase consumer slaves.

13. The method of claim 12 wherein the probe-phase consumer slaves combine the pieces of information from the second source that were not filtered out with any pieces of information from the first source that have the same join key value.

14. The method of claim 12 wherein:
the pieces of information from the first source are rows of a left-hand row source involved in a parallelized join operation within a database server; and
the pieces of information from the second source are rows of a right-hand row source involved in said parallelized join operation.

15. The method of claim 12 wherein at least one node of the plurality of nodes uses a plurality of concurrently executing slaves to perform the steps of hashing and building.

16. The method of claim 15 wherein the concurrently executing slaves build the complete bitmap filter in shared memory of the at least one node.

17. A method for combining left-hand rows from a left-hand row source with right-hand rows from a right-hand row source based on a join key, wherein the right-hand row source is statically partitioned, wherein static partitions of the right-hand row source correspond to unique sets of join key values, the method comprising:
 establishing a mapping between each node of a plurality of nodes and each of the unique sets of join key values;
 for each unique set of join key values, distributing left-hand rows that have join key values that fall within the unique set to the corresponding node of plurality of nodes;
 at each of the plurality of nodes, performing the steps of
  hashing the left-hand rows received by the node into hash buckets of a hash table;
  building and storing in a non-transitory computer-readable storage medium a bitmap filter chunk that indicates the hash buckets into which the left-hand rows were hashed;
  obtaining right-hand rows from the one or more static partitions, of the right hand source, that are associated with the one or more unique sets of join key values that are mapped to the node;
  using the bitmap filter chunk built and stored in the node to filter out the right-hand rows that hash to hash buckets to which no left-hand rows were hashed;
 wherein the method is performed by one or more computing devices.

18. The method of claim 17 wherein:
 the left-hand row source is statically partitioned into partitions that correspond to the unique sets of join key values; and
 the step of distributing left-hand rows that have join key values that fall within the unique set to the corresponding node of plurality of nodes is performed by causing the partition, of the left-hand source, that corresponds to a unique set of join values to be scanned by one or more slaves on the node to which the unique set of join values was mapped.

19. The method of claim 17 wherein:
 the left-hand row source is not statically partitioned based on the join key; and
 the step of distributing left-hand rows that have join key values that fall within the unique set to the corresponding node of plurality of nodes is performed by scanning the left-hand source using a plurality of build-phase producer slaves, and causing the build-phase producer slaves to distribute the left-hand rows based on
  the unique set of join values into which the join key values of the left-hand rows fall, and
  the mapping between nodes and the unique sets of join values.

20. A non-transitory computer-readable storage medium storing one or more sequences of instructions which, when executed by one or more processors, causes the one or more processors to perform the method recited in claim 1.

21. A non-transitory computer-readable storage medium storing one or more sequences of instructions which, when executed by one or more processors, causes the one or more processors to perform the method recited in claim 2.

22. A non-transitory computer-readable storage medium storing one or more sequences of instructions which, when executed by one or more processors, causes the one or more processors to perform the method recited in claim 3.

23. A non-transitory computer-readable storage medium storing one or more sequences of instructions which, when executed by one or more processors, causes the one or more processors to perform the method recited in claim 4.

24. A non-transitory computer-readable storage medium storing one or more sequences of instructions which, when executed by one or more processors, causes the one or more processors to perform the method recited in claim 5.

25. A non-transitory computer-readable storage medium storing one or more sequences of instructions which, when executed by one or more processors, causes the one or more processors to perform the method recited in claim 6.

26. A non-transitory computer-readable storage medium storing one or more sequences of instructions which, when executed by one or more processors, causes the one or more processors to perform the method recited in claim 7.

27. A non-transitory computer-readable storage medium storing one or more sequences of instructions which, when executed by one or more processors, causes the one or more processors to perform the method recited in claim 8.

28. A non-transitory computer-readable storage medium storing one or more sequences of instructions which, when executed by one or more processors, causes the one or more processors to perform the method recited in claim 9.

29. A non-transitory computer-readable storage medium storing one or more sequences of instructions which, when executed by one or more processors, causes the one or more processors to perform the method recited in claim 10.

30. A non-transitory computer-readable storage medium storing one or more sequences of instructions which, when executed by one or more processors, causes the one or more processors to perform the method recited in claim 11.

31. A non-transitory computer-readable storage medium storing one or more sequences of instructions which, when executed by one or more processors, causes the one or more processors to perform the method recited in claim 12.

32. A non-transitory computer-readable storage medium storing one or more sequences of instructions which, when executed by one or more processors, causes the one or more processors to perform the method recited in claim 13.

33. A non-transitory computer-readable storage medium storing one or more sequences of instructions which, when executed by one or more processors, causes the one or more processors to perform the method recited in claim 14.

34. A non-transitory computer-readable storage medium storing one or more sequences of instructions which, when executed by one or more processors, causes the one or more processors to perform the method recited in claim 15.

35. A non-transitory computer-readable storage medium storing one or more sequences of instructions which, when executed by one or more processors, causes the one or more processors to perform the method recited in claim 16.

36. A non-transitory computer-readable storage medium storing one or more sequences of instructions which, when executed by one or more processors, causes the one or more processors to perform the method recited in claim 17.

37. A non-transitory computer-readable storage medium storing one or more sequences of instructions which, when executed by one or more processors, causes the one or more processors to perform the method recited in claim 18.

38. A non-transitory computer-readable storage medium storing one or more sequences of instructions which, when executed by one or more processors, causes the one or more processors to perform the method recited in claim 19.

* * * * *

UNITED STATES PATENT AND TRADEMARK OFFICE
CERTIFICATE OF CORRECTION

PATENT NO. : 8,145,642 B2
APPLICATION NO. : 11/001363
DATED : March 27, 2012
INVENTOR(S) : Cruanes et al.

Page 1 of 1

It is certified that error appears in the above-identified patent and that said Letters Patent is hereby corrected as shown below:

On front page, in column 2, under "Other Publications", line 7, delete "pdf," and insert -- pdf>, --, therefor.

On front page, in column 2, under "Attorney, Agent, or Firm" delete "Troung" and insert -- Truong --, therefor.

Signed and Sealed this
Seventeenth Day of July, 2012

David J. Kappos
*Director of the United States Patent and Trademark Office*